US008547597B2

(12) United States Patent
Ogawa

(10) Patent No.: US 8,547,597 B2
(45) Date of Patent: Oct. 1, 2013

(54) IMAGE FORMING APPARATUS, CONTROL METHOD OF IMAGE FORMING APPARATUS, AND COMPUTER PROGRAM PRODUCT FOR FORMING AN IMAGE COMPRISED OF OVERLAPPING COLOR AND TRANSPARENT IMAGES

(75) Inventor: Takeshi Ogawa, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 777 days.

(21) Appl. No.: 12/719,255

(22) Filed: Mar. 8, 2010

(65) Prior Publication Data

US 2010/0238509 A1 Sep. 23, 2010

(30) Foreign Application Priority Data

Mar. 18, 2009 (JP) ................................ 2009-066440

(51) Int. Cl.
*H04N 1/405* (2006.01)

(52) U.S. Cl.
USPC .......... 358/3.06; 358/1.9; 358/3.03; 358/504; 358/534; 358/536; 347/14; 347/16; 347/19; 399/45; 399/49; 399/53

(58) Field of Classification Search
None
See application file for complete search history.

(56) References Cited

U.S. PATENT DOCUMENTS

| | | | | |
|---|---|---|---|---|
| 6,515,768 | B1 * | 2/2003 | Deschuytere et al. | 358/3.06 |
| 7,101,017 | B2 * | 9/2006 | Endo et al. | 347/19 |
| 7,354,127 | B2 * | 4/2008 | Endo | 347/19 |
| 7,616,910 | B2 * | 11/2009 | Bessho | 399/49 |
| 7,682,015 | B2 * | 3/2010 | Hoshino | 347/102 |
| 7,959,252 | B2 * | 6/2011 | Endo | 347/19 |
| 8,023,152 | B2 * | 9/2011 | Li et al. | 358/3.03 |
| 8,086,124 | B2 * | 12/2011 | Zaima | 399/53 |
| 2007/0127940 | A1 * | 6/2007 | Zaima | 399/53 |

FOREIGN PATENT DOCUMENTS

| | | |
|---|---|---|
| JP | 63-293064 | 11/1988 |
| JP | 2675001 | 7/1997 |
| JP | 2711098 | 10/1997 |
| JP | 2008-254341 | 10/2008 |

* cited by examiner

*Primary Examiner* — Dung Tran
(74) *Attorney, Agent, or Firm* — Oblon, Spivak, McClelland, Maier & Neustadt, L.L.P.

(57) ABSTRACT

Dot patterns formed by two different half-tone processes of the plurality of tone processes for each color of CMYK and formed with/without the presence and absence of transparent toner overlap are created and test patches obtained by collecting the dot patterns are printed. The printed test patches are read to generate image data, and tone correction arithmetic is performed on the basis of the image data. Concentration in the case of the presence of transparent toner in a different half-tone process is predicted based on the dot patterns with the transparent toner overlap in the test patches and concentration in the case of the absence of transparent toner in a different half-tone process is predicted based on the dot patterns without the transparent toner overlap in the test patches. The tone correction arithmetic is performed based on the predicted values.

9 Claims, 9 Drawing Sheets

FIG. 9

MACHINE DIFFERENCE CORRECTION VALUE

| CORRECTION VALUE | CORRECTION VALUE | |
|---|---|---|
| | J (0) | J (1023) |
| 150-LINE CYAN WITHOUT TRANSPARENT TONER OVERLAP | 7 | −28 |
| 150-LINE MAGENTA WITHOUT TRANSPARENT TONER OVERLAP | 5 | −16 |
| 150-LINE YELLOW WITHOUT TRANSPARENT TONER OVERLAP | 0 | −26 |
| 150-LINE BLACK WITHOUT TRANSPARENT TONER OVERLAP | 46 | −27 |
| 200-LINE CYAN WITH TRANSPARENT TONER OVERLAP | 4 | −25 |
| 200-LINE MAGENTA WITH TRANSPARENT TONER OVERLAP | 3 | −13 |
| 200-LINE YELLOW WITH TRANSPARENT TONER OVERLAP | 1 | −21 |
| 200-LINE BLACK WITH TRANSPARENT TONER OVERLAP | 42 | −22 |

IMAGE FORMING APPARATUS, CONTROL METHOD OF IMAGE FORMING APPARATUS, AND COMPUTER PROGRAM PRODUCT FOR FORMING AN IMAGE COMPRISED OF OVERLAPPING COLOR AND TRANSPARENT IMAGES

CROSS-REFERENCE TO RELATED APPLICATIONS

The present application claims priority to and incorporates by reference the entire contents of Japanese Patent Application No. 2009-066440 filed in Japan on Mar. 18, 2009.

BACKGROUND OF THE INVENTION

1. Field of the Invention

The present invention relates to an image forming apparatus, a control method of the image forming apparatus, and a computer program product.

2. Description of the Related Art

With the spread of information processing apparatuses such as copiers, word processors, or computers, and other communication equipment, an apparatus that forms images by using a recording head that operates according to ink-jet technology has become widely used as an image forming apparatus that outputs information from these apparatuses onto a printing medium, such as paper. Moreover, with high definition and colorization of visual information in the information processing apparatus and communication equipment, demands for high image quality and colorization of the image forming apparatus are increasing.

An image forming apparatus for meeting such demands generally has a recording device array that is formed by integrating and arraying a plurality of recording devices in order to correspond to the miniaturization of print pixels. The image forming apparatus has a plurality of recording heads, of which each is made by high densely integrating a plurality of ink discharge openings and liquid paths, for each ink of cyan, magenta, yellow, and black in order to correspond to colorization. This is known as printing according to the ink-jet method.

Moreover, there is another printing method that uses electrophotographic technology. Electrophotographic technology is a method for forming an electrostatic latent image on an electrostatic latent image carrier (image carrier) by using a photoconductive phenomenon and attaching a colored charged corpuscle (toner) to the electrostatic latent image by using an electrostatic force to form a visible image.

In recent years, picture quality similar to that of silver halide photography has been demanded in the field of ink-jet technology and electrophotographic technology. Granularity and glossiness are demanded that is similar to that of the picture quality of silver halide photography.

Glossiness problems can be solved by performing printing on dedicated paper having excellent glossiness. On the other hand, because dedicated paper having such glossiness is expensive, there is a technology for performing printing by using transparent toner (transparent powder ink), transparent ink, and the like to cheaply form an image having glossiness similar to that of silver halide photography. Moreover, varnish printing, UV-cured ink printing, and the like have been widely used. In this manner, a technology for improving glossiness is becoming widespread in a comparatively cheap configuration by overlapping transparent toner or transparent ink on regular ink.

Granularity is improved by a half-tone process. In recent years, as in a half-tone process such as dithering or error diffusion, the high number of lines dithering technique and FM (Frequency Modulation) characteristics have been demanded. This reason is that the lower spatial frequency is, in other words, the lower the number of lines dithering is, the higher the responsiveness of a human eye is to easily recognize dots and this leads to show high granularity.

Each pixel of a silver halide photograph is colored at the molecular level. On the contrary, each pixel in ink-jet technology and electrophotography is colored with dots of which each diameter is 20 to 40 micrometers. For this reason, it becomes important that the human eye does not recognize dots in order to create the feeling a photograph is like a silver halide photograph. As a result, the important thing is for a half-tone process such as an error diffusion process or a minimized average error that has the high number of lines dithering or FM dithering and FM characteristics.

Additionally, it is preferable to suppress the variation of concentration to obtain the same picture quality as that of silver halide photography. For example, the variation of concentration can be suppressed by regularly measuring concentration and performing concentration correction on the basis of the measurement. Japanese Patent Application Laid-open No. 2008-254341 discloses such a correction technique. According to Japanese Patent Application Laid-open No. 2008-254341, test patterns having different concentration are formed in accordance with an image formation process upon power-on and every time when the predetermined number of print sheets have been printed, or every time when receiving a request from the user. For example, in the case of a printing process, a test pattern is formed by using a dithering pattern corresponding to the print process. In the case of a copy process, a test pattern is formed by using a dithering pattern corresponding to the copy process. Then, the concentration of the printed test pattern is detected to obtain brightness or a dot area ratio, a γ correction table is corrected on the basis of the brightness or the dot area rate, and the concentration of the input image data is corrected in accordance with the corrected γ correction table to form an image.

Moreover, even if an image forming apparatus is an apparatus that employs electrophotography or ink-jet technology by which a picture of the same quality as that of silver halide photography can be output, printing with only the picture quality of silver halide photography is rare and outputting an image required in a general office is further demanded. Because print images demanded in a general office require high stability and low granularity, it is considered that the high number of lines dithering or FM dithering is used with low frequency unlike silver halide photography. In recent years, because an image forming apparatus that employs ink-jet technology or electrophotographic technology can perform a plurality of half-tone processes, one image forming apparatus can be separately used as an office application and a silver halide photography application.

When transparent ink is used, because surface scattering characteristics are different depending on whether transparent ink is used, correction must be changed depending on whether transparent ink is used. For this reason, because concentration correction must be separately performed in accordance with the presence or absence of transparent ink for each half tone even if the image forming apparatus that employs ink-jet technology or electrophotographic technology performs a plurality of half-tone processes, there is a problem in that it takes a considerable amounts of trouble and the cost of consumables such as paper, ink, and toner is high.

SUMMARY OF THE INVENTION

It is an object of the present invention to at least partially solve the problems in the conventional technology.

According to an aspect of the present invention, there is provided an image forming apparatus that forms an image by overlapping a colored first image and a transparent second image. The image forming apparatus includes an image forming unit that forms an image based on image data by using the first image and the second image; a pattern creating unit that selects at least two from a plurality of half-tone processes and creates pattern data indicating a plurality of concentration patterns created by using the selected half-tone processes, respectively; an image formation control unit that controls the image forming unit to form the pattern based on the pattern data created by the pattern creating unit by using the first image and to form the pattern, among the patterns formed of the first image, created by at least one of the selected half-tone processes by overlapping the first image and the second image; a reading unit that reads the pattern formed by overlapping the first image and the second image and the pattern formed of only the first image that are formed by the image forming unit under the control of the image formation control unit; and a tone correcting unit that performs tone correction based on a result of the reading unit when forming the image by the image forming unit.

According to another aspect of the present invention, there is provided a control method of an image forming apparatus that forms an image by overlapping a colored first image and a transparent second image and that includes an image forming unit, a pattern creating unit, an image formation control unit, a reading unit, and a tone correcting unit. The control method includes forming an image based on image data by using the first image and the second image using the image forming unit; selecting at least two from a plurality of half-tone processes and creating pattern data indicating a plurality of concentration patterns created by using the selected half-tone processes, respectively, using the pattern creating unit; controlling, using the image formation control unit, the image forming unit to form the pattern based on the pattern data created in the creating by using the first image and to form the pattern, among the patterns formed of the first image, created by at least one of the selected half-tone processes by overlapping the first image and the second image; reading the pattern formed by overlapping the first image and the second image and the pattern formed of only the first image that are formed by the image forming unit under the control of the image formation control unit; and performing tone correction based on a result of the reading unit when forming the image by the image forming unit.

According to still another aspect of the present invention, there is provided a computer program product that causes a computer to perform the method according to the present invention.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is an outlined diagram illustrating an example of machine difference correction values for correcting a difference between image forming apparatuses;

DETAILED DESCRIPTION OF THE PREFERRED EMBODIMENTS

Exemplary embodiments of the present invention will be explained in detail below with reference to the accompanying drawings. However, the present invention is not limited to these embodiments.

Figure 1:
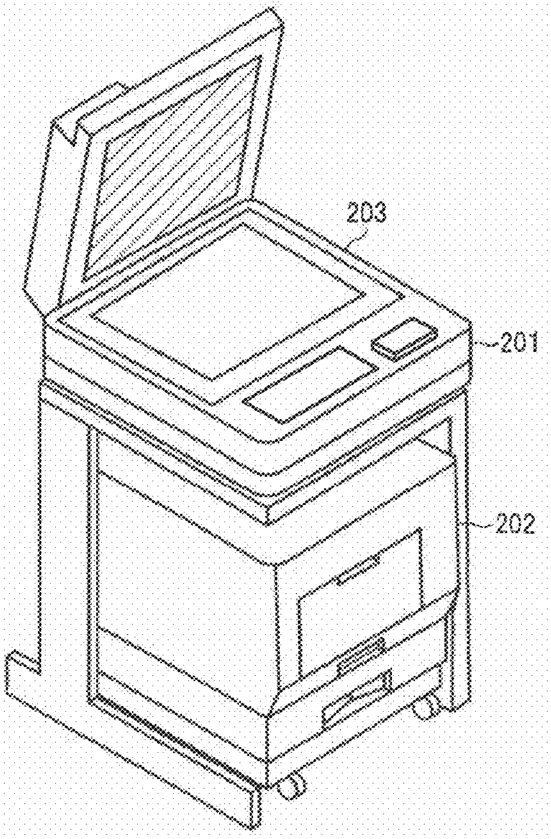
FIG. 1 is an external view illustrating an example of the configuration of an image forming apparatus that can be applied to an embodiment of the present invention.

FIG. 1 is an external view illustrating an example of the configuration of an image forming apparatus that can be applied to an embodiment of the present invention.

In FIG. 1, the image forming apparatus includes a reading unit 201 that reads a document and converts the read document into image data, an image forming unit 202 that forms an image on a page space on the basis of the image data, and an image processing unit 203 that performs image processing on the image data that is obtained by reading the document by the reading unit 201. The image processing unit 203 is configured inside the image forming apparatus and cannot be observed from the outside. The image forming unit 202 forms an image on the basis of the image data processed by the image processing unit 203.

Figure 2:
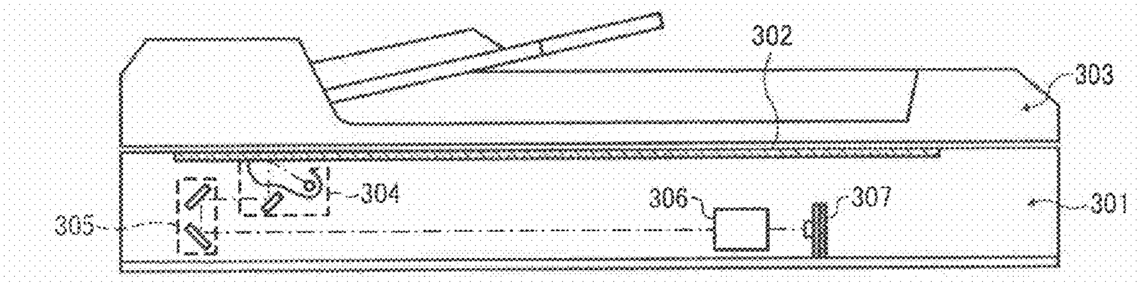
FIG. 2 is a cross-sectional view illustrating an example of the structure of a reading unit of the image forming apparatus that can be applied to an embodiment of the present invention.

FIG. 2 is a cross-sectional view illustrating an example of the structure of the reading unit 201 of the image forming apparatus illustrated in FIG. 1. A document board 302 and an automatic document feeder (hereinafter, "ADF") 303 are provided at the upper side of an image reading unit 301. The ADF 303 is supported on the top face of the document board 302 in a state where the ADF 303 can open or close the document board 302 and is mounted to have a predetermined positional relationship against the surface of the document board 302. The ADF 303 carries out an operation by which documents are automatically arranged on the document board 302.

If it will be explained about a transportation operation performed by the ADF 303, a document is first conveyed toward the document board 302 in such a manner that one of the surfaces of the document faces the image reading unit 301 at a predetermined position of the document board 302. Next, after image input (image reading) performed by the image reading unit 301 on the one surface is terminated, the ADF 303 discharges the document to a paper ejecting unit included in the ADF 303 and carries out a similar transportation operation on the next document.

The image reading unit 301 includes first and second document scanning bodies 304 and 305 that are arranged under the document board 302 to input the image information of the document carried onto the document board 302 by the ADF 303 and reciprocate parallel along the lower surface of the document board 302, an optical lens 306, and a CCD (Charge Coupled Device) 307 that is a photoelectric transducer.

The first document scanning body 304 includes an exposure lamp that exposes a document image surface and a first mirror that changes a reflected light image from the document toward a predetermined direction. The first document scanning body 304 reciprocates at a predetermined scanning speed parallel to the lower surface of the document board 302 while keeping a constant distance with respect to the lower surface. The second document scanning body 305 includes second and third mirrors that further deflect the reflected light image deflected by the first mirror of the first document scanning body 304 toward a predetermined direction. The second document scanning body 305 reciprocates parallel to the first document scanning body 304 while keeping constant speed relationship with the first document scanning body 304.

The optical lens 306 reduces the reflected light deflected by the third mirror of the second document scanning body 305 and forms the reduced light image at a predetermined position of the CCD 307. The CCD 307 photo-electrically converts the formed light image one after another and outputs the converted signal as an electrical signal.

The CCD 307 is a three-line color-CCD line sensor that can read a monochrome image or a color image present on the surface of the document and can output line data obtained by color-separating the read image into the color components of R (red), G (green), and B (blue). The image information of the document converted into electrical signals (RGB signal or the like) by the CCD 307 is changed to the image data of the color components of C (cyan), M (magenta), Y (yellow), and K (black) by using color conversion BG/UCR and the image data is transferred to the image processing unit 203.

Figure 3:
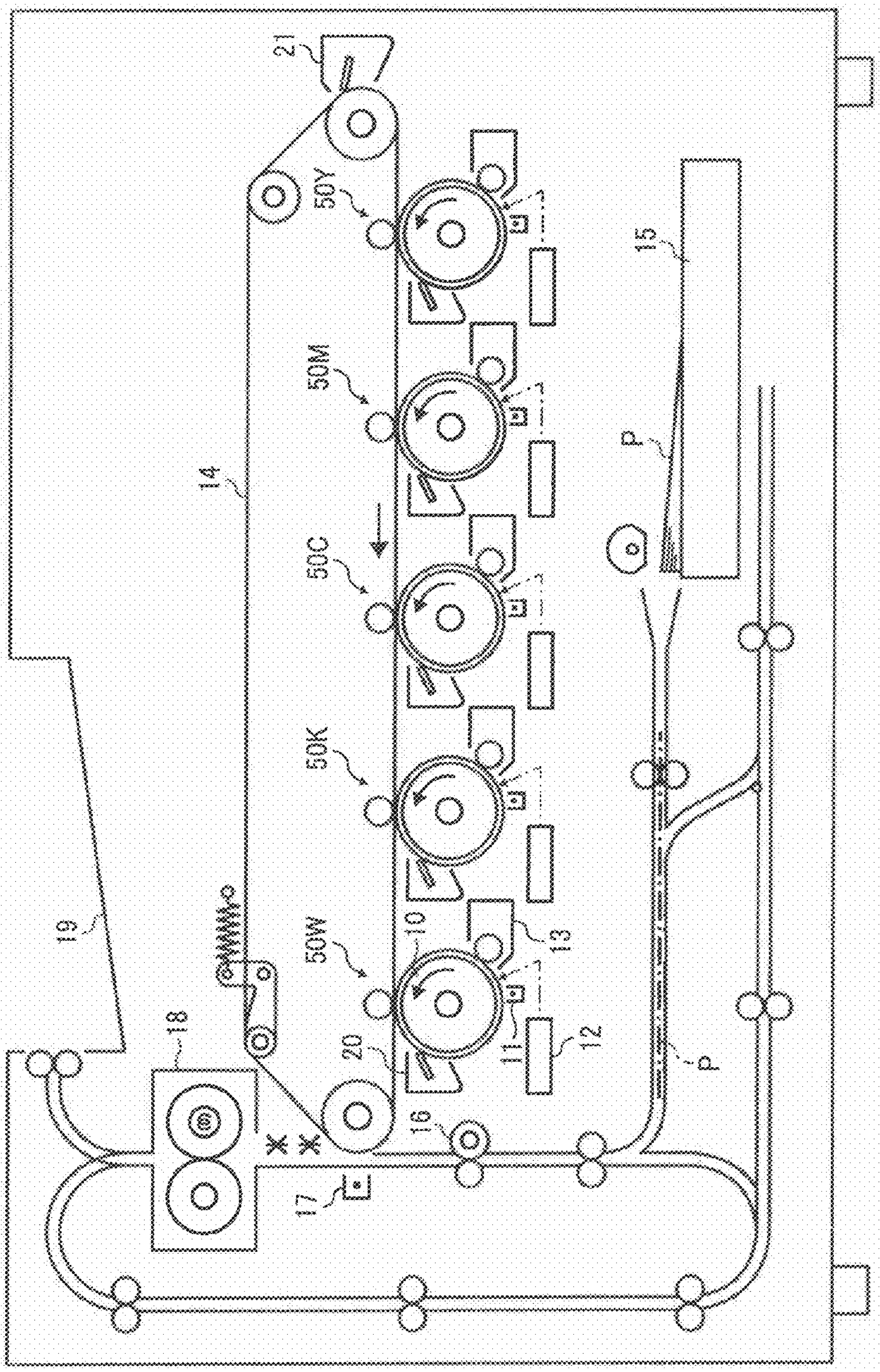
FIG. 3 is an outlined diagram illustrating an example of the structure of an image forming unit according to electrophotographic technology.

Next, it will be explained about the image forming unit 202 illustrated in FIG. 1. The image forming unit 202 may operate in an electrophotographic manner or in an ink-jet manner. FIG. 3 illustrates an example of the structure of the image forming unit 202 according to an electrophotographic technology. The image forming unit 202 illustrated in FIG. 3 forms the toner images of yellow (Y), magenta (M), cyan (C), black (K), and transparence (W) on circumferential surfaces of a plurality of image forming bodies, superimposes these toner images on an intermediate transfer body to transfer (primary transfer) these, and then retransfer (secondary transfer) these to transfer paper.

Image formation units 50Y, 50M, 50C, 50K, and 50W of yellow (Y), magenta (M), cyan (C), black (K), and transparence (W) that include a photo conductor drum 10, a charging device 11, an exposure optical system 12, a developing device 13, and a cleaning device 20 are arranged from the upstream of the rotation direction of a transfer belt 14 that is a belt-shaped intermediate transfer body. Therefore, the toner images of yellow (Y), magenta (M), cyan (C), and black (K) formed by the image formation units 50 are sequentially superimposed on the circumferential surface of the transfer belt 14 to be transferred (primary transfer) and to be a color toner image, and a transparent toner image is further superimposed and formed on the highest layer by the image formation unit 50W.

The transparent toner image and the lower color toner image are together transferred (secondary transfer) to the surface of recording paper P fed via a timing roller 16 from a paper feeding cassette 15 by using an electric discharge action that has a polarity opposite to the toner of a transfer device 17. In a state where the transparent toner image is located on the lowest layer and the color toner image is located on its upper layer on the recording paper P, toner is deposited by a fixing device 18 on the recording paper P and then the recording paper P turns in a horizontal direction and is discharged through a tray 19 located at the upper side of the apparatus. After transfer, the transfer belt 14 removes remaining toner by the cleaning device 20 to clean the belt.

Figure 4:
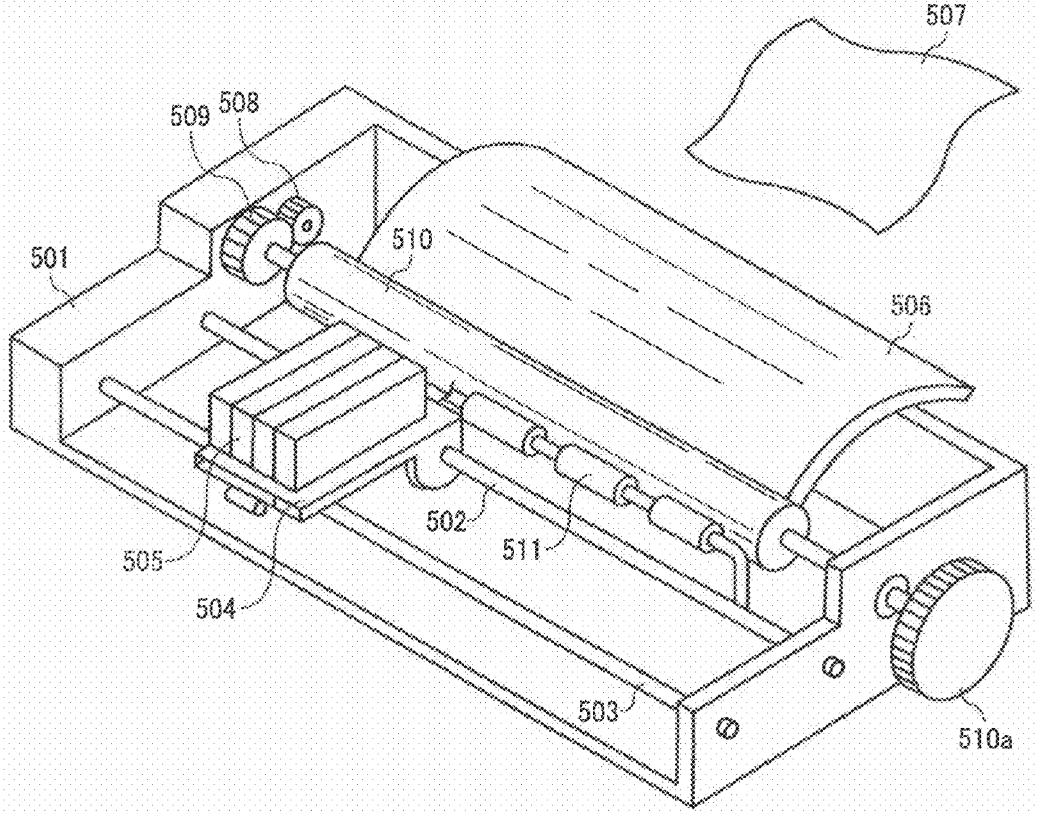
FIG. 4 is an outlined diagram illustrating an example of the structure of an image forming unit according to ink-jet technology.

FIG. 4 illustrates an example of the structure of the image forming unit 202 according to an ink-jet technology. The image forming unit 202 illustrated in FIG. 4 employs transparence (W) ink along with all-color ink of black (K), yellow (Y), magenta (M), and cyan (C).

In the image forming unit 202 illustrated in FIG. 4, an ink-jet recording head 505 (hereinafter, "recording head") is mounted on a carriage 504 that is movably provided on guide rails 502 and 503 bridged laterally to a frame 501 and the carriage 504 is moved in the guide rail direction to be able to be scanned (main scanning) by using a driving source such as a motor not illustrated. Paper 507 guided and supplied by a guide plate 506 is taken in a platen 510 including a feed knob 510*a* pivoted via a gear 508 and a sprocket gear 509 and is conveyed by the circumferential surface of the platen 510 and a pressure roller 511 pressed against the surface to perform print on the paper 507 by using the recording head 505.

Figure 5:
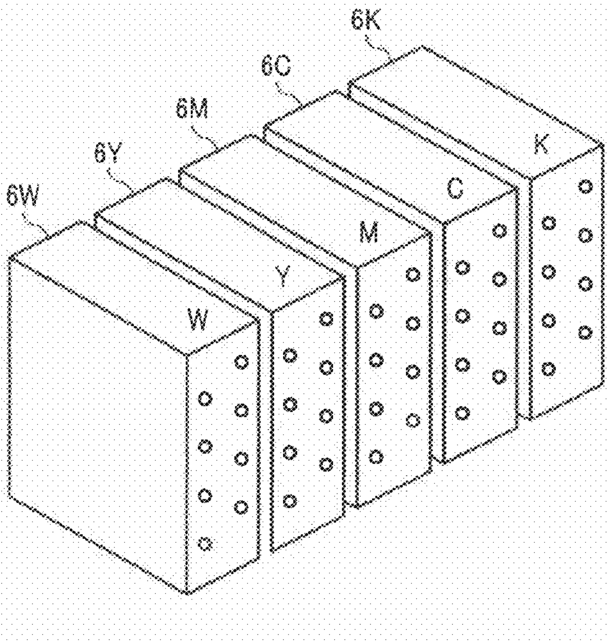
FIG. 5 is an external view of an example of a recording head that is used for ink-jet technology.

The recording head 505 includes five ink-jet heads {6K, 6Y, 6M, 6C, 6W} that respectively discharge ink of black (K), yellow (Y), magenta (M), cyan (C), and transparence (W) illustrated in FIG. 5 to be arranged on the same line of a main-scanning direction. The type or the number of ink may be increased or decreased depending on the configuration of device.

The ink-jet heads selectively drive an actuator that is an energy generating means such as a piezoelectric element or a heater for bubble generation to give pressure to ink inside a liquid chamber. As a result, ink drop is discharged and flied from a nozzle communicating with the liquid chamber and is attached to the paper 507 to form an image (image forming).

In FIG. 1, it has been explained so that the reading unit 201 and the image forming unit 202 are independently present. However, this is not limited to the example. The reading unit 201 and the image forming unit 202 may be configured integrally.

Figure 6:
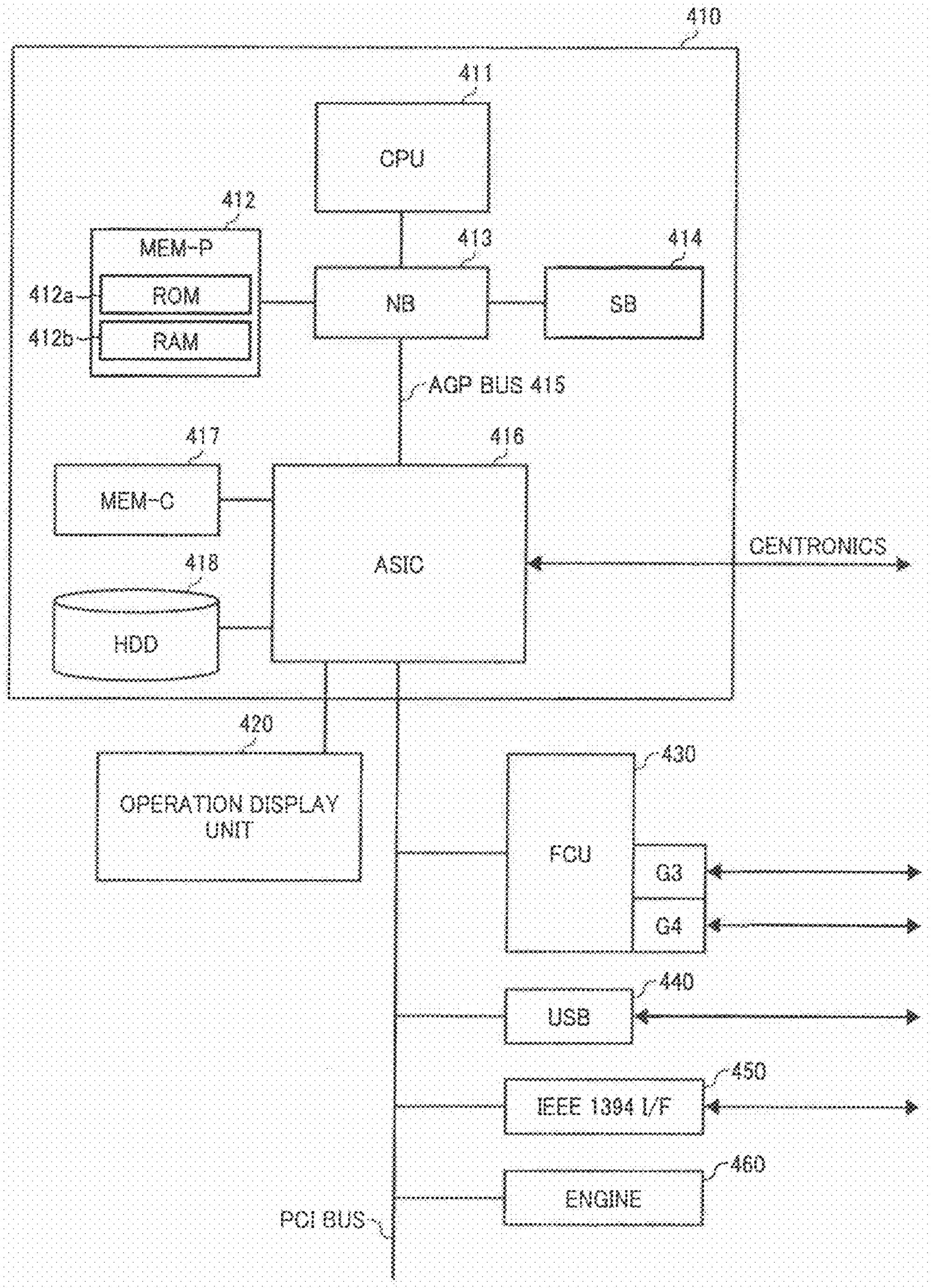
FIG. 6 is a block diagram illustrating an example of the hardware configuration of the image forming apparatus according to the present embodiment.

FIG. 6 is a block diagram illustrating an example of the hardware configuration of the image forming apparatus according to the present embodiment. As illustrated in FIG. 6, the image forming apparatus is configured in such a manner that a controller 410 and an engine 460 are connected by a PCI (Peripheral Component Interface) bus. The controller 410 controls the whole of the image forming apparatus, drawing, communication, and input from an operating unit not illustrated. The engine 460 is a printer engine that can be connected to the PCI bus and corresponds to the image forming unit 202 and the reading unit 201 described above. In addition, the engine 460 further includes an image processing part such as error diffusion or gamma conversion in addition to a so-called engine part such as a plotter scanner.

The controller 410 includes a CPU (Central Processing Unit) 411, a north bridge (NB) 413, a system memory (MEM- P) 412, a south bridge (SB) 414, a local memory (MEM-C) 417, an ASIC (Application Specific Integrated Circuit) 416, and a hard disk drive (HDD) 418. The controller 410 has a configuration that the north bridge (NB) 413 is connected to the ASIC 416 by an AGP (Accelerated Graphics Port) bus 415. Moreover, the MEM-P 412 further includes a ROM (Read Only Memory) 412*a* and a RAM (Random Access Memory) 412*b*.

The CPU 411 totally controls the image forming apparatus in accordance with a program. The CPU 411 has a chip set that consists of the NB 413, the MEM-P 412, and the SB 414 and is connected to other devices via the chip set. The function of the image processing unit 203 described above is realized by, for example, a program that is executed on the CPU 411.

The NB 413 is a bridge that connects the CPU 411 to the MEM-P 412, the SB 414, and the AGP 415. The NB 413 includes a memory controller, which controls the reading and writing or the like from and to the MEM-P 412, and a PCI master and an AGP target.

The MEM-P 412 is a system memory that is utilized as a storing memory that stores a program and data, a developing memory that develops a program and data, a drawing memory that draws a printer, and the like. The MEM-P 412 includes the ROM 412*a* and the RAM 412*b*. The ROM 412*a* is a read-out-dedicated memory that is used as a storing memory that stores a program and data. The RAM 412*b* is a writable and readable memory that is utilized as a developing memory that develops a program and data, a drawing memory that draws a printer, and the like.

The SB 414 is a bridge that connects the NB 413 to a PCI device and a peripheral device. The SB 414 is connected to the NB 413 via a PCI bus. A network interface (I/F) unit and the like are also connected to the PCI bus.

The ASIC 416 is an IC (Integrated Circuit) for image processing application that has hardware elements for image processing. The ASIC 416 acts as a bridge that connects the AGP 415, the PCI bus, the HDD 418, and the MEM-C 417. The ASIC 416 consists of a PCI unit that performs data transfer through the PCI bus between the PCI target and the AGP master, an arbiter (ARB) that functions as the core of the ASIC 416, the memory controller that controls the MEM-C 417, a plurality of DMACs (Direct Memory Access Controller) that performs the rotation and the like of image data by using hardware logic, and the engine 460.

A FCU (Facsimile Control Unit) 430, a USB (Universal Serial Bus) 440, and an IEEE 1394 (the Institute of Electrical and Electronics Engineers 1394) interface 450 are connected to the ASIC 416 via the PCI bus. An operation display unit 420 is directly connected to the ASIC 416.

The MEM-C 417 is a local memory that is used as an image buffer for copy and a code buffer. The HDD (Hard Disk Drive) 418 is a storage that performs the accumulation of image data, the accumulation of programs, the accumulation of font data, and the accumulation of forms.

The AGP 415 is a bus interface for a graphics accelerator card that is proposed to speed up a graphics process. The AGP 415 directly accesses the MEM-P 412 at high throughput to speed up the graphics accelerator card.

Figure 7:
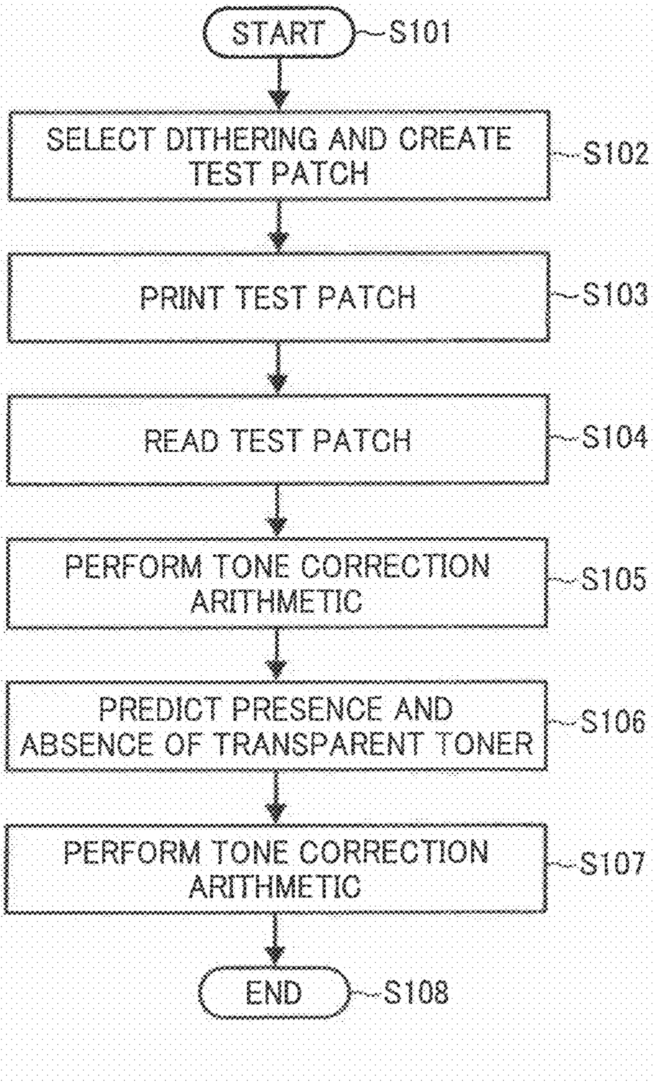
FIG. 7 is a flowchart schematically illustrating the procedure of concentration correction according to an embodiment of the present invention.

FIG. 7 is a flowchart schematically illustrating the procedure of concentration correction according to an embodiment of the present invention. In FIG. 7, a process is started at Step S101. Two arbitrary half-tone processes are selected from the plurality of half-tone processes (dithering) at Step S102. At this time, the two half-tone processes may be previously decided or may be selected by a user. Then, as described below with reference to FIG. 8, dot patterns that are formed by two different half-tone processes selected from a plurality of tones for each color of CMYK and are formed with/without the overlap of transparent toner or ink are created.

Next, a test patch that is obtained by collecting the dot patterns created at Step S102 is printed by the image forming unit 202 at Step S103. At Step S104, the printed test patch is read by the reading unit 201 to generate image data. At Step S105, tone correction arithmetic is performed on the basis of the image data that is obtained by reading the test patch at Step S104. At Step S106, a predicted value of concentration or brightness in the case of presence of transparent toner or ink in a different half-tone process is calculated based on the dot patterns with the overlap of the transparent toner or ink in the test patch. Similarly, a predicted value of concentration or brightness in the case of absence of transparent toner or ink in a different half-tone process is calculated based on the dot patterns without the overlap of the transparent toner or ink in the test patch. The tone correction arithmetic is performed based on the calculated predicted value at Step S107 and the process is terminated at Step S108.

Figure 8:
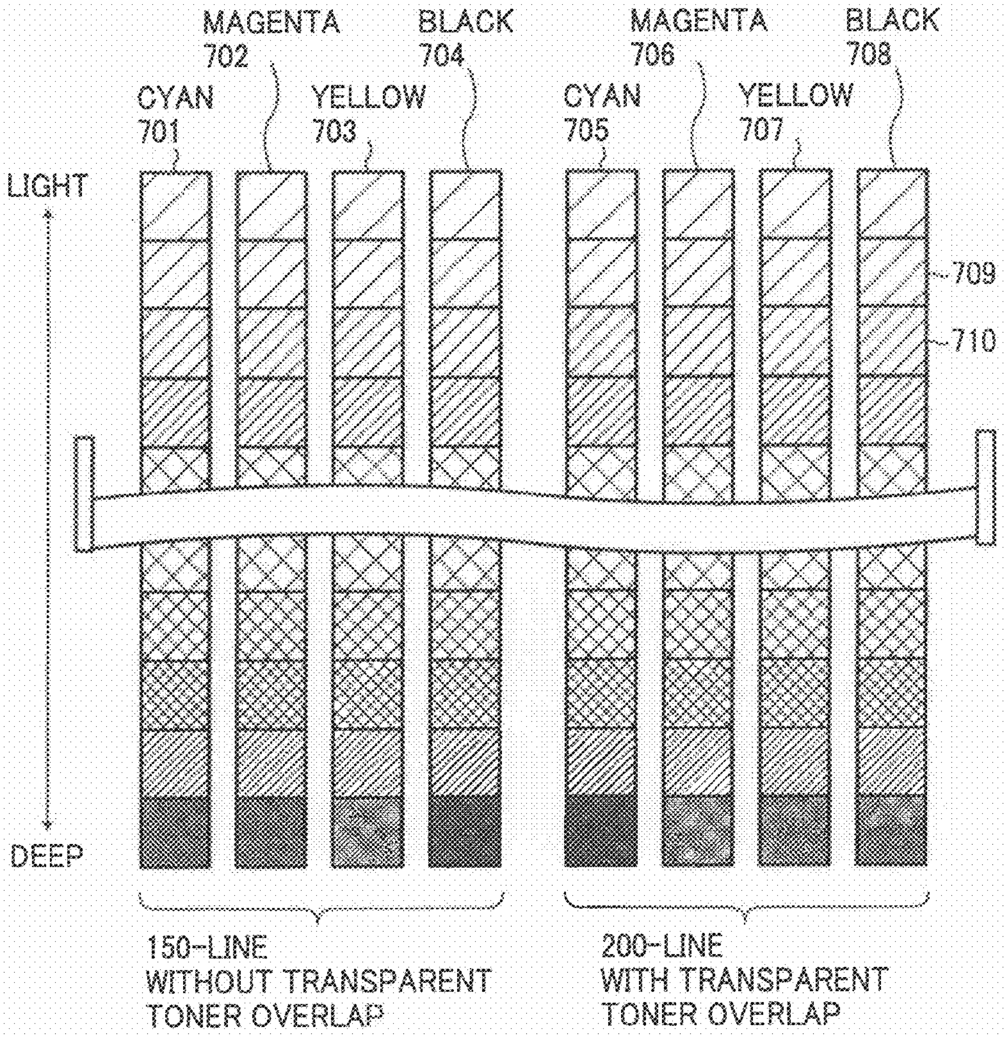
FIG. 8 is an outlined diagram illustrating an example of the configuration of a test patch.

FIG. 8 illustrates an example of the configuration of test patches that are created at Step 102 described above and are printed by the image forming unit 202 at Step S103. The test patches are configured with patch lines that are obtained by arraying C, M, Y, and K patches of which concentration values are sequentially changed. A patch 701 is a dot pattern in a highlight part of 150-line dithering cyan, a patch 702 is a dot pattern in a highlight part of 150-line dithering magenta, a patch 703 is a dot pattern in a highlight part of 150-line dithering yellow, and a patch 704 is a dot pattern in a highlight part of 150-line dithering black.

Moreover, a patch 705 is a dot pattern in a highlight part of 200-line dithering cyan, a patch 706 is a dot pattern in a highlight part of 200-line dithering magenta, a patch 707 is a dot pattern in a highlight part of 200-line dithering yellow, and a patch 708 is a dot pattern in a highlight part of 200-line dithering black.

Each patch line has concentration that rises from the highlight part as in the patch 708, a patch 709, and a patch 710 of the 200-line dithering black. The patch 701 and the patch 705 differ in the number of lines of dithering. On the patch 705, the layer of transparent toner or ink is formed in the overlap manner. In other words, when compared with the patches in the patch line to which the patch 701 belongs, the patches in the patch line to which the patch 705 belongs have a difference in that solid patches of transparent toner or ink are overlapped. Similarly, in the patch lines of the patch 706, the patch 707, and the patch 708, solid patches of transparent toner of ink are overlapped.

Next, it will be explained about a method for generating a tone conversion table performed by the image processing unit 203.

Here, it is assumed that the reading value of each patch illustrated in FIG. 8 is a value v[t][i]. In this case, "t" indicates a patch line (t=150-line cyan without transparent toner overlap, 150-line magenta without transparent toner overlap, 150-line yellow without transparent toner overlap, 150-line black without transparent toner overlap, 200-line cyan with transparent toner overlap, 200-line magenta with transparent toner overlap, 200-line yellow with transparent toner overlap, or 200-line black with transparent toner overlap), and "i" indicates concentration. Because the tone conversion table is created by the same process in each patch line illustrated in FIG. 8, a line is explained as a value v[i] in a mass.

Reference data is given by a set of a reading value v[i] of a scanner and a writing value LD[i] (i=1, 2, . . . , and m) of the corresponding laser. In order to simplify the subsequent description, the reference data is expressed as A[n[i]] (0≤n[i]≤255; i=1, 2, . . . , and m). A value "m" is the number of reference data. The reference data is previously stored in the ROM 412*a* or the like and is supplied, for example, before the shipping of the image forming apparatus.

FIG. 9 illustrates an example of a machine difference correction value for correcting a difference between image forming apparatuses. Values illustrated in FIG. 9 are correction values corresponding to each plate of cyan, magenta, yellow, and black with/without the transparent toner overlap. Value J(0) and J(1023) indicate correction values for reference data value "0" and reference data value "1023" (when the bit depth of image data is 10 bits). The correction values illustrated in the FIG. 9 are previously stored in the ROM 412*a* and is supplied, for example, before the shipping of the image forming apparatus.

Assuming that the value of reference data after correction is $A_1$[t][n[i]], reference data A[t][n[i]] is corrected as described below by using the value illustrated in FIG. 9 to obtain the reference data $A_1$[t][n[i]] after correction. Then, the $A_1$[t][n[i]] after correction is used as a new A[t][n[i]].

$$A_1[t][n[i]]=A[t][n[i]]+(k(1023)-k(0))\times n[i]/1023+k(0)$$

Next, it will be explained about the tone conversion table. The tone conversion table is obtained by comparing a reading value a[LD] to be described below and the reference data A[n] that is previously stored in the ROM 412*a*. In this case, the value "n" is an input value that is input into the tone conversion table. The reference data A[n] is the target value of image data that is obtained by reading each pattern of FIG. 8, which is output by a laser writing value LD[i] after the tone conversion of the input value "n", by using a scanner (the reading unit 201).

A laser writing value LD[n] corresponding to the input value "n" that is input into the tone conversion table is obtained by obtaining a laser writing value LD corresponding to A[n] from data a[LD] to be described below. The tone conversion table can be created by obtaining this value for the input value i=0, 1, . . . , and 255 (when the bit depth of image data is 8 bit).

At that time, instead of performing a process on all the input values n=00h, 01h, . . . , and FFh (hexadecimal number) that are input into the tone conversion table, the process is performed on discrete values such as input values $n_i$=00h, 11h, 22h, . . . , and FFh and interpolation may be performed on the other values by using a spline function or linear interpolation.

Figure 10:
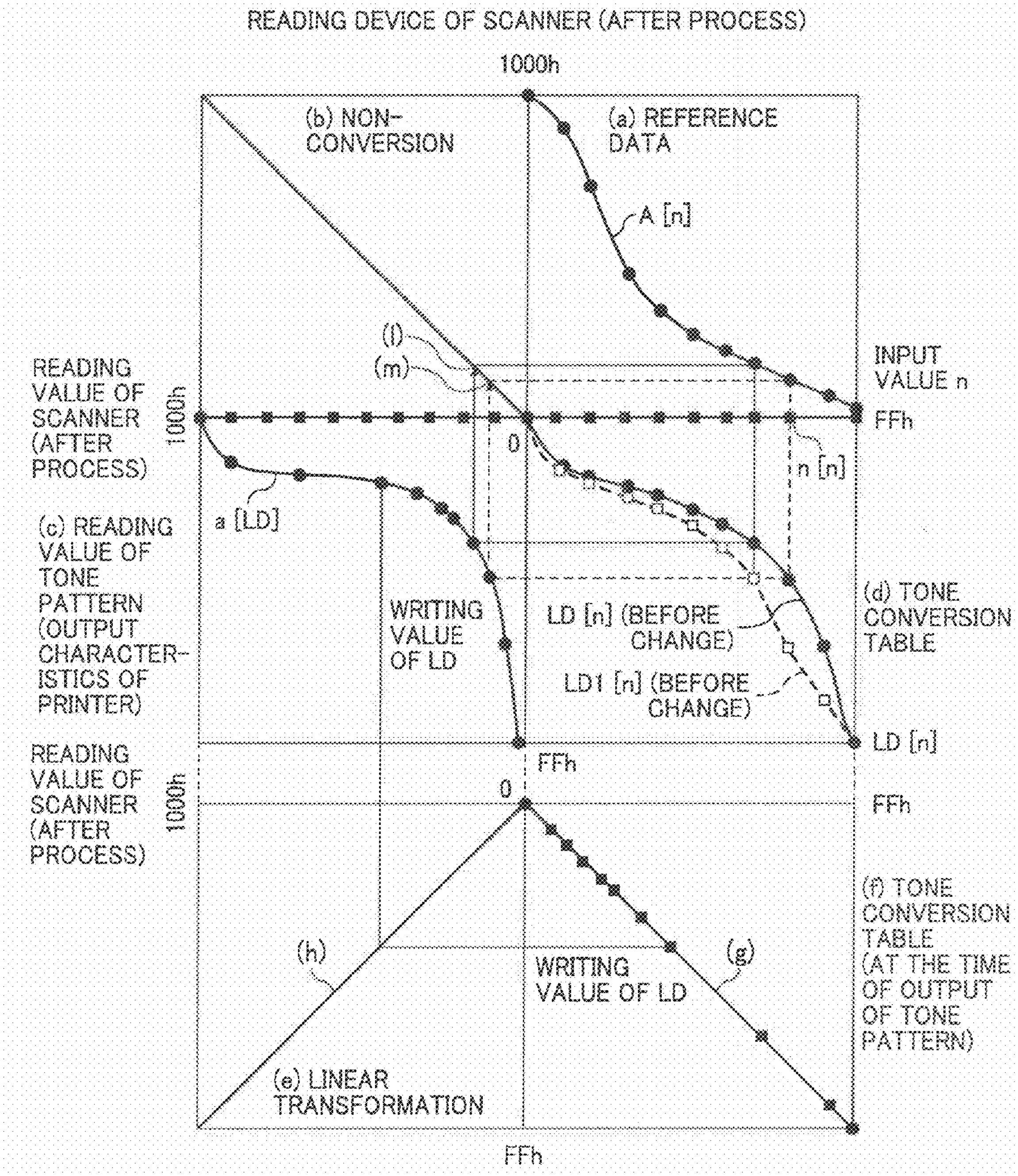
FIG. 10 is a four-quadrant chart exemplary explaining a process for obtaining a tone conversion table.

It will be explained about a process for obtaining the tone conversion table on the basis of a four-quadrant chart of FIG. 10. In FIG. 10, the horizontal axis of a first quadrant (a) indicates the input value "n" that is input into the tone conversion table and the vertical axis indicates the reference data A[i] that is the reading value of a scanner (after a process). The reading value of a scanner (after a process) is obtained by performing an average process and an addition process on read data read at the several points inside a tone pattern, which are obtained by reading the tone pattern by the scanner. For the sake of the improvement of an arithmetic precision, the reading value is processed as a 10-bit data signal. RGB γ conversion may be further performed.

In FIG. 10, the horizontal axis of a second quadrant (b) (and the horizontal axis of a third quadrant (c)) indicates the reading value of a scanner (after a process) similarly to the above vertical axis. In FIG. 10, the vertical axis of the third quadrant (c) indicates the writing value of laser light (LD). The data a[LD] indicates the characteristic of a printer unit.

In addition, the writing value of laser light in a test patch line that is actually formed is, for example, 16 points of 00h (background), 11h, 22h, . . . , EEh, and FFh that show discrete values. These discrete values are utilized as continuous values by performing interpolation between detection points.

The graph (d) of a fourth quadrant is a graph for obtaining the tone conversion table LD[i]. The vertical axis of the graph (d) indicates the writing value of laser light and the horizontal axis thereof indicates the input value "n".

The vertical axis and horizontal axis of a graph (f) respectively indicate the writing value of laser light and the input value "n" similarly to the vertical axis and horizontal axis of the graph (d). When forming a test patch, a tone conversion table (g) illustrated in the graph (f) is utilized.

The horizontal axis of a graph (e) is the reading value of a scanner (after a process) similarly to the third quadrant (c) and the vertical axis thereof is the writing value of laser light. The graph (e) indicates expediential linear transformation indicative of a relation between the writing value of laser light in the creation of the test patch and the reading value of the scanner (after a process) of the tone pattern.

The reference data A[n] is obtained for a certain input value "n", and the output LD[n] of laser light for obtaining A[n] is obtained along an arrow (l) illustrated in FIG. 10 by using the reading value a[LD] of the test patch.

By performing the process, a tone conversion table for 150-line without transparent toner overlap and 200-line with transparent toner overlap can be created.

Next, in the test patch illustrated in FIG. 8, a value of a pattern of 200-line without transparent toner overlap that is to be read by a scanner is predicted on the basis of a value of a pattern of 150-line without transparent toner overlap that has been read by a scanner. Similarly, a value of a pattern of 150-line with transparent toner overlap that is to be read by a scanner is predicted on the basis of a value of a pattern of 200-line with transparent toner overlap that is read by a scanner.

The spectral reflectance of a primary color to a four-primary color according to each primary color are computed by using a Kubelka-Munk model on the basis of the amount of the printed toner or ink as described below. In other words, the reflectance R of a 100% simple-color solid image can be predicted by the next Equation (1) by using the Kubelka-Munk model.

$$R = R_0 + \frac{T_i^2 \cdot R_g}{1 - R_0 \cdot R_g} \quad (1)$$

Figure 11:
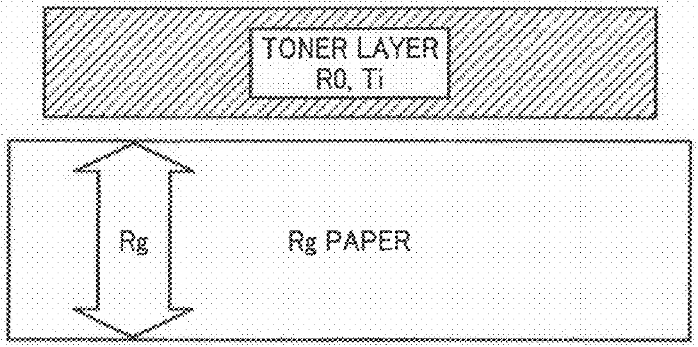
FIG. 11 is an outlined diagram explaining a method for obtaining a reflectance.

As an example, as typically illustrated in FIG. 11, $R_g$ in Equation (1) is the reflectance of paper, $R_0$ is the reflectance according to scattering in a toner layer in a fixing state, and $T_i$ is the transmission factor of the toner layer in the fixing state. It is preferable to previously prepare the reflectance of standard paper as the reflectance factor $R_g$. Moreover, the reflectance $R_0$ and the transmission factor $T_i$ can be obtained from $R_\infty$ and SX of the next Equation (2).

$$R_0 = \frac{1}{a + b\cdot \coth(b \cdot SX)} \quad (2)$$

$$T_i = (a - R_0)^2 - b^2$$

-continued $$a = \frac{\left(\frac{1}{R_\infty} + R_\infty\right)}{2}$$

$$b = \sqrt{a^2 - 1}$$

In this case, the Value $R_\infty$ is a reflectance according to scattering in the toner layer when the thickness of the toner layer in the fixing state is infinite and can be previously calculated because the value is a value that is determined by the characteristic of toner. Moreover, the value SX is a product that is obtained by multiplying the scattering coefficient S of the toner by the layer thickness X of the toner layer. Therefore, the product SX is proportional to the layer thickness X. The scattering coefficient S is a value that is determined by the characteristic of toner. If the reflectance R obtained by Equation (1) and Equation (2) is calculated for each spectroscopic wavelength, the spectral reflectance of a simple color (primary color) is obtained.

Moreover, in a secondary color that is obtained by overlapping toner layers, a reflectance on the surface of a first layer (lower layer) is first computed by the method described above by using Equation (1) and Equation (2). Because the surface of the first layer is an underlayer for a second layer (upper layer), the reflectance of the toner layer of the second layer is similarly calculated by the equation and a total spectral reflectance of the secondary color is calculated by using the reflectance R of the surface of the first layer as the reflectance $R_g$ (the reflectance of paper) for the second layer.

Similarly, the spectral reflectance of each of a tertiary color and a four-primary color can be also calculated. In addition, because the derivation procedure of a reflectance according to the above-described Kubelka-Munk model is well-known, as an example, as described in the document "D. B. Judd and G. Wyszecki: Color in Business, Science and Industry, Wiley-Interscience, (1975) p. 314-330", their detailed descriptions are omitted.

In the present embodiment, because the spectral reflectance of each of a primary color to a four-primary color is calculated in this way, the reflectance $R_g$ and $R_\infty$ for each color and the product SX in a reference state are previously stored in, for example, the ROM 412*a* as fixed information.

Next, the spectral reflectance of a half-tone color made by the toner of each primary color is computed by a Neugebauer equation and a Yule Nielsen model that are shown by the following Equation (3) on the basis of the spectral reflectance of each of a primary color to a four-primary color made of primary colors of C, M, Y, and K that are obtained in this way.

$$R(\lambda)n^1 = A_W \cdot R_W(\lambda)n^1 + A_C \cdot R_C(\lambda)n^1 + A_M \cdot R_M(\lambda)n^1 + A_Y \cdot R_Y(\lambda)n^1 + A_K \cdot R_K(\lambda)n^1 + A_{CM} \cdot R_{CM}(\lambda)n^1 + A_{MY} \cdot R_{MY}(\lambda)n^1 + A_{CY} \cdot R_{CY}(\lambda)n^1 + A_{CK} \cdot R_{CK}(\lambda)n^1 + A_{MK} \cdot R_{MK}(\lambda)n^1 + A_{YK} \cdot R_{YK}(\lambda)n^1 + A_{CMY} \cdot R_{CMY}(\lambda)n^1 + A_{CMK} \cdot R_{CMK}(\lambda)n^1 + A_{CYK} \cdot R_{CYK}(\lambda)n^1 + A_{MYK} \cdot R_{MYK}(\lambda)n^1 + A_{CMYK} \cdot R_{CMYK}(\lambda)n^1 \quad (3)$$

In this case, the value R(λ) is a half-tone spectral reflectance and the value $R_X(\lambda)$ is a spectral reflectance of the 100% solid image of a primary color to a four-primary color that is obtained by the Kubelka-Munk model. Moreover, the value $R_W(\lambda)$ is a spectral reflectance of paper and the value "n" is the "n" value of Yule Nielsen that corrects a phenomenon called "dot gain". Because the "n" value is decided by the characteristic of paper, the type of screen, or the like, the "n" value is previously calculated as an appropriate value. The value $A_X$ is a dot area ratio and can be calculated by the next Equation (4). In Equation (4), the Values $a_C$, $a_M$, $a_Y$, and $a_K$ are the image information of C, M, Y, and K, respectively.

$$A_W = (1-a_C)\cdot(1-a_M)\cdot(1-a_Y)\cdot(1-a_K)$$

$$A_C = a_C\cdot(1-a_M)\cdot(1-a_Y)\cdot(1-a_K)$$

$$A_M = (1-a_C)\cdot a_M\cdot(1-a_Y)\cdot(1-a_K)$$

$$A_Y = (1-a_C)\cdot(1-a_M)\cdot a_Y\cdot(1-a_K)$$

$$A_K = (1-a_C)\cdot(1-a_M)\cdot(1-a_Y)\cdot a_K$$

$$A_{CM} = a_C\cdot a_M\cdot(1-a_Y)\cdot(1-a_K)$$

$$A_{MY} = (1-a_C)\cdot a_M\cdot a_Y\cdot(1-a_K)$$

$$A_{CY} = a_C\cdot(1-a_M)\cdot a_Y\cdot(1-a_K)$$

$$A_{CK} = a_C\cdot(1-a_M)\cdot(1-a_Y)\cdot a_K$$

$$A_{MK} = (1-a_C)\cdot a_M\cdot(1-a_Y)\cdot a_K$$

$$A_{YK} = (1-a_C)\cdot(1-a_M)\cdot a_Y\cdot a_K$$

$$A_{CMY} = a_C\cdot a_M\cdot a_Y\cdot(1-a_K)$$

$$A_{CMK} = a_C\cdot a_M\cdot(1-a_Y)\cdot a_K$$

$$A_{CYK} = a_C\cdot(1-a_M)\cdot a_Y\cdot a_K$$

$$A_{MYK} = (1-a_C)\cdot a_M\cdot a_Y\cdot a_K$$

$$A_{CMYK} = a_C\cdot a_M\cdot a_Y\cdot a_K \quad (4)$$

The reproduction color for each primary color of C, M, Y, and K can be predicted based on the spectral reflectance of the half-tone color obtained by the above process. In addition, because the derivation procedure of a reflectance performed by the above-described Neugebauer equation and Yule Nielsen model is well known, as an example, as described in "H. R. Kang: Color Technology or Electronic Imaging Devices, SPIE Optical Engineering Press, (1997) p. 34-45", their detailed descriptions are omitted.

In this manner, the reproduction color for each primary color of C, M, Y, and K can be predicted by previously and appropriately calculating the "n" value of Yule Nielsen decided by the characteristic of paper, the type of screen, or the like. Although a CMYK image can be predicted by Equation (3) and Equation (4), each of CMYK can be also predicted separately.

Figure 12:
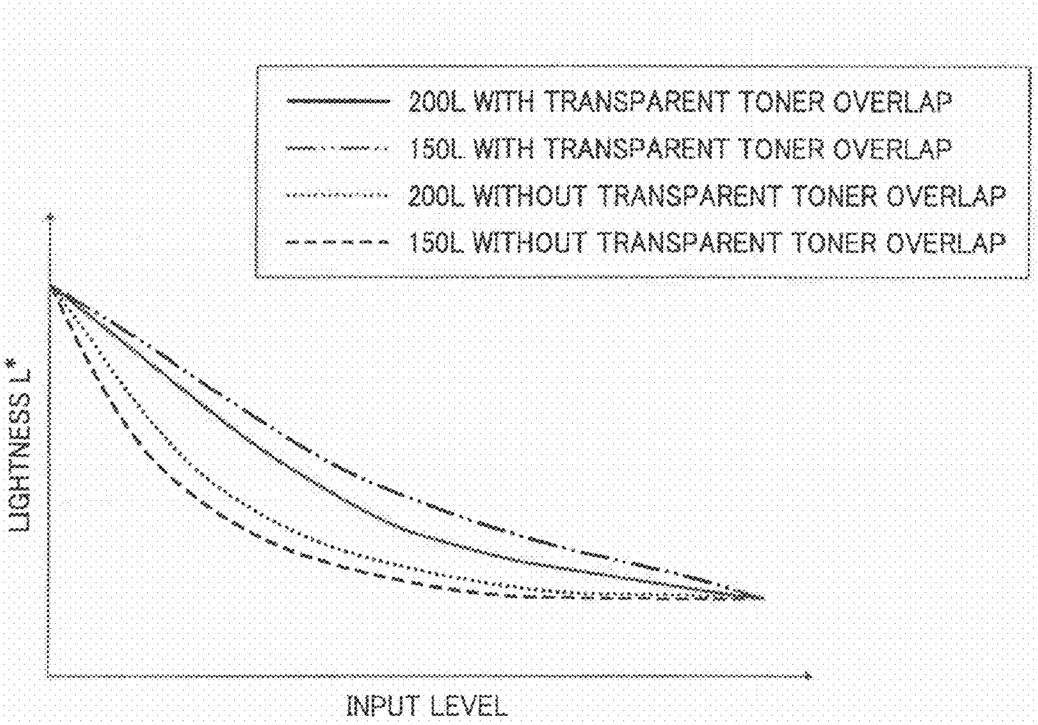
FIG. 12 is an outlined diagram illustrating an example of results for predicted values in the presence/absence of transparent overlap.

The predicted value in the case of each of the presence and absence of transparent overlap is calculated on the basis of Equation (3) and Equation (4). FIG. 12 illustrates the result of an example when the value of 150-line dithering with transparent overlap is predicted from 200-line dithering with transparent overlap in black (K). In FIG. 12, the result of an example when the value of 200-line dithering without transparent overlap is predicted from 150-line dithering without transparent overlap is further illustrated. A tone conversion table of 150-line dithering with transparent overlap and a tone conversion table of 200-line dithering without transparent overlap are created on the basis of the predicted value.

As above, in the present embodiment, the calibration of a tone conversion table is performed in accordance with the procedure illustrated in FIG. 7.

Next, it will be explained about why there is the effect of calibration by performing such a process. In regard to the demand for obtaining a photo quality by using transparent toner or ink, it is preferable that a half-tone process is performed by the high number of lines, FM dithering, an error diffusion process, or the like. Moreover, although a sufficiently good image is obtained even when a tone conversion table is created on the basis of the value predicted by Equation (3) and Equation (4), it is considered that the creation of a tone conversion table based on an actual measurement value has high reliability. Actually, even in the case of an actual measurement value, a tone conversion table is created on the basis of a result that is obtained by performing an interpolation operation on the discrete-concentration patches illustrated in FIG. 8.

Because the prediction of a predicted value is performed two times by performing the operation of a predicted value and an interpolation operation, the prediction method is inferior to a prediction method that is performed by an actual measurement value one time in terms of reliability. Therefore, as a combination for obtaining a photo quality, the a half-tone process by means of either FM dithering or an error diffusion process of the high number of lines with transparent toner or ink may be performed. Moreover, as a combination for responding to a demand of picture quality demanded in a general office or the like, it is sufficient to perform the dithering of the middle or low number of lines without transparent toner or ink.

(Effects)

As is apparent from the above-mentioned description, according to the present invention, a plurality of half-tone processes and concentration correction in the case of each of presence and absence of transparent toner or ink can be performed easily.

Other Embodiments

As described above, it has been explained about correction in the case where transparent toner or ink is overlapped. However, the present invention is not limited thereto. Even if transparent ink or toner is pre-coated or pre-hit, a similar effect is obtained. When pre-coating or pre-hitting is performed in an ink-jet technology, a preferable result is obtained in terms of ink blur by utilizing bonding agent having a binding action.

Moreover, although the present invention has been explained by using electro-photographs, the present invention can be applied to a plotter that can output general transparent ink that is used for ink-jet printing or photogravure printing.

Furthermore, the present invention may be applied to a system that consists of a plurality of apparatuses (for example, a host computer, an interface device, a reader, a printer, and the like), or may be applied to an apparatus that consists of one apparatus (for example, a duplicator, a facsimile machine, or the like).

Moreover, the object of the invention can be achieved by supplying a storage medium that records program codes of software for realizing the function of the previously-described embodiment to a system or an apparatus and by reading and executing the program codes stored in the storage medium by a computer (CPU or MPU) of the system or the apparatus. In this case, the function of the previously-described embodiment is realized by the program codes read from the storage medium.

A storage medium that supplies program codes can include, for example, a flexible disk, a hard disk, an optical disc, a magneto-optical disk, a magnetic tape, a nonvolatile memory card, and a ROM.

Moreover, in addition that the computer reads out and executes the program codes to realize the function of the previously-described embodiment, an OS (operating system) or the like that operates on the computer can perform a part or the whole of an actual process and realizes the function of the previously-described embodiment by the process on the basis of the instructions of the program codes.

Furthermore, after the program codes read from the storage medium are written into a memory that is provided in a function enhancement board inserted into the computer or a function enhancement unit connected to the computer, a CPU or the like that is provided in the function enhancement board or the function enhancement unit can perform a part or the whole of an actual process and realizes the function of the previously-described embodiment by the process on the basis of the instructions of the program codes.

As described above, according to an aspect of the present invention, the plurality of half-tone processes and concentration correction with/without the overlap of the transparent toner or ink can be simply performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that forms an image by overlapping a colored first image and a transparent second image formed of transparent ink, the image forming apparatus comprising:

an image forming unit that forms the image based on image data by using the colored first image and the transparent second image formed of transparent ink;

a pattern creating unit that selects at least two of a plurality of half-tone processes, and that creates pattern data indicating a plurality of concentration patterns created using the selected half-tone processes, respectively;

an image formation control unit that controls the image forming unit to form a first concentration pattern based on the pattern data created by the pattern creating unit using the first image, and to form a second concentration pattern, among the concentration patterns formed of the first image, created by at least one of the selected half-tone processes by overlapping the first image and the second image;

a reading unit that reads the second concentration pattern formed by overlapping the first image and the second image and the first concentration pattern formed of only the first image that are formed by the image forming unit under the control of the image formation control unit;

a tone correcting unit that performs tone correction based on a result of the reading unit when forming the image by the image forming unit;

a predicting unit that predicts a first result when the reading unit reads a third concentration pattern formed by a first different half-tone process and formed by overlapping the first image and the second image based on the result obtained by reading the second concentration pattern formed by overlapping the first image and the second image by the reading unit, and that predicts a second result when the reading unit reads a fourth concentration pattern formed by a second different half-tone process and formed of only the first image based on the result obtained by reading the first concentration pattern of only the first image by the reading unit; and a gradation correcting unit that creates a first correction coefficient for gradation correction when the second concentration pattern is formed by overlapping the first image and the second image, and a second correction coefficient when the first concentration pattern is formed of only the first image, on the basis of one of the first result and the second result predicted by the predicting unit.

2. The image forming apparatus according to claim 1, wherein the pattern creating unit creates the pattern data indicating the second concentration pattern is to be formed by overlapping the first image and the second image using one of the selected half-tone processes that is used to form a photo image.

3. The image forming apparatus according to claim 2, wherein the pattern creating unit creates, using the half-tone process used to form the photo image, the pattern data indicating the second concentration pattern, with a number of lines greater than a number of lines associated with a concentration pattern created using a half-tone process used to form a non-photo image.

4. The image forming apparatus according to claim 1, wherein the pattern creating unit creates the pattern data indicating the second concentration pattern to be formed by overlapping the first image and the second image using one of the selected half-tone processes which includes frequency modulation (FM) characteristics according to an error diffusion or a minimized average error.

5. The image forming apparatus according to claim 1, wherein the pattern creating unit creates the pattern data indicating the second concentration pattern to be formed by overlapping the first image and the second image using one of the selected half-tone processes based on frequency modulation (FM) dithering.

6. The image forming apparatus according to claim 1, wherein the image forming unit overlays the second image on the first image.

7. The image forming apparatus according to claim 1, wherein the image forming unit overlays the first image on the second image.

8. A control method of an image forming apparatus that forms an image by overlapping a colored first image and a transparent second image formed of transparent ink, and that includes an image forming unit, a pattern creating unit, an image formation control unit, a reading unit, and a tone correcting unit, the control method comprising:

forming the image based on image data by using the colored first image and the transparent second image formed of transparent ink using the image forming unit;

selecting at least two of a plurality of half-tone processes, and creating pattern data indicating a plurality of concentration patterns created using the selected half-tone processes, respectively;

controlling, using the image formation control unit, the image forming unit to form a first concentration pattern based on the pattern data created in the creating using the first image, and to form a second concentration pattern, among the concentration patterns formed of the first image, created by at least one of the selected half-tone processes by overlapping the first image and the second image;

reading the second concentration pattern formed by overlapping the first image and the second image and the first concentration pattern formed of only the first image that are formed by the image forming unit under the control of the image formation control unit;

performing tone correction based on a result of the reading unit when forming the image by the image forming unit;

predicting a first result when the reading unit reads a third concentration pattern formed by a first different half-tone process and formed by overlapping the first image and the second image based on the result obtained by reading the second concentration pattern formed by overlapping the first image and the second image by the reading unit, and predicting a second result when the reading unit reads a fourth concentration pattern formed by a second different half-tone process and formed of only the first image based on the result obtained by reading the first concentration pattern of only the first image by the reading unit; and creating a first correction coefficient for gradation correction when the second concentration pattern is formed by overlapping the first image and the second image, and a second correction coefficient when the first concentration pattern is formed of only the first image, on the basis of one of the predicted first result and the predicted second result.

9. A non-transitory computer-readable storage medium storing computer-readable instructions that, when executed by a computer, cause the computer to perform a method for controlling an image forming apparatus that forms an image by overlapping a colored first image and a transparent second image formed of transparent ink, and that includes an image forming unit, a pattern creating unit, an image formation control unit, a reading unit, and a tone correcting unit, the method comprising:

forming the image based on image data by using the colored first image and the transparent second image formed of transparent ink using the image forming unit;

selecting at least two of a plurality of half-tone processes, and creating pattern data indicating a plurality of concentration patterns created using the selected half-tone processes, respectively, using the pattern creating unit;

controlling, using the image formation control unit, the image forming unit to form a first concentration pattern based on the pattern data created in the creating using the first image, and to form a second concentration pattern, among the concentration patterns formed of the first image, created by at least one of the selected half-tone processes by overlapping the first image and the second image;

reading the second concentration pattern formed by overlapping the first image and the second image and the first concentration pattern formed of only the first image that are formed by the image forming unit under the control of the image formation control unit;

performing tone correction based on a result of the reading unit when forming the image by the image forming unit;

predicting a first result when the reading unit reads a third concentration pattern formed by a first different half-tone process and formed by overlapping the first image and the second image based on the result obtained by reading the second concentration pattern formed by overlapping the first image and the second image by the reading unit, and predicting a second result when the reading unit reads a fourth concentration pattern formed by a second different half-tone process and formed of only the first image based on the result obtained by reading the first concentration pattern of only the first image by the reading unit; and creating a first correction coefficient for gradation correction when the second concentration pattern is formed by overlapping the first image and the second image, and a second correction coefficient when the first concentration pattern is formed of only the first image, on the basis of one of the predicted first result and the predicted second result.

* * * * *